(12) United States Patent
Lender

(10) Patent No.: US 6,741,636 B1
(45) Date of Patent: May 25, 2004

(54) SYSTEM AND METHOD FOR CONVERTING DATA INTO A NOISE-LIKE WAVEFORM

(75) Inventor: Adam Lender, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 746 days.

(21) Appl. No.: 09/604,661

(22) Filed: Jun. 27, 2000

(51) Int. Cl.$^7$ .............................. H04B 1/69; H04K 1/00
(52) U.S. Cl. ...................................... 375/146; 380/270
(58) Field of Search .................................. 375/130, 150, 375/259, 200, 206, 146, 295; 380/255, 268, 270

(56) References Cited

U.S. PATENT DOCUMENTS

| | | |
|---|---|---|
| 3,234,456 A | 2/1966 | Gamble |
| 3,238,299 A | 3/1966 | Lender |
| 3,263,185 A | 7/1966 | Lender |
| 3,303,284 A | 2/1967 | Lender |
| 3,317,720 A | 5/1967 | Lender |

(List continued on next page.)

OTHER PUBLICATIONS

H. Nyquist, Certain Factors Affecting Telegraph Speed, American Telephone and Telegraph Company, May 1924.

H. Nyquist, Certain Topics in Telegraph Transmission Theory, American Telephone and Telegraph Company, Aug. 1928.

A. Lender "Correlative (Partial Response) Techniques and Applications to Digital Radio Systems", Chapter 7, pp. 144–183, Digital Communications: Microwave Applications, K. Fehr, editor Prentice Hall, Inc. 1981.

Primary Examiner—Stephen Chin
Assistant Examiner—Jason M. Perilla
(74) Attorney, Agent, or Firm—McDermott, Will & Emery

(57) ABSTRACT

A system and method of modulation of digital data to create a low probability of intercept communication system. The method comprises the steps of receiving digital data (or analog data and converting it into digital data), modulating the digital data signal, scrambling the digital data signal using here an eight position shift register with appropriately positioned feedback elements, converting the modulated-scrambled signal into a direct-sequence pseudo noise spread spectrum signal, converting the spread spectrum signal into a gaussian type signal, resulting in a white and gaussian noise-like characteristics. The system and method employ proved and innovative correlative techniques in converting data into a noise-like waveform. This insures a higher degree of immunity to interception, and provides an unmatched level of privacy and security over all types of communication media.

17 Claims, 12 Drawing Sheets

System Block Diagram for Conversion of Data into Noise Like Waveform

U.S. PATENT DOCUMENTS

| | | |
|---|---|---|
| 3,337,863 A | 8/1967 | Lender |
| 3,337,864 A | 8/1967 | Lender |
| 3,343,125 A | 9/1967 | Lender |
| 3,371,279 A | 2/1968 | Lender |
| 3,387,213 A | 6/1968 | Lender |
| 3,387,220 A | 6/1968 | Lender |
| 3,392,238 A | 7/1968 | Lender |
| 3,406,255 A | 10/1968 | Lender |
| 3,457,510 A | 7/1969 | Lender |
| 3,461,426 A | 8/1969 | Lender |
| 3,475,558 A * | 10/1969 | Cahn ........................... 370/312 |
| 3,515,805 A * | 6/1970 | Fracassi ....................... 380/46 |
| 3,515,991 A | 6/1970 | Lender |
| 3,518,547 A * | 6/1970 | Filipowsky ................. 375/145 |
| 3,601,702 A | 8/1971 | Lender |
| 3,633,105 A | 4/1972 | Lender et al. |
| 3,665,394 A | 5/1972 | Lender et al. |
| 3,746,787 A | 7/1973 | Lender |
| 3,750,021 A | 7/1973 | Lender |
| 3,811,038 A * | 5/1974 | Reddaway ................... 708/250 |
| 3,993,953 A | 11/1976 | Lender et al. |
| 4,078,157 A | 3/1978 | Lender et al. |
| 4,078,159 A | 3/1978 | Lender et al. |
| 4,086,566 A | 4/1978 | Lender |
| 4,086,587 A | 4/1978 | Lender |
| 4,110,691 A | 8/1978 | Lender |
| 4,112,263 A | 9/1978 | Lender |
| 4,118,686 A | 10/1978 | Lender |
| 4,241,447 A * | 12/1980 | Epstein ........................ 375/150 |
| 4,406,009 A | 9/1983 | Lender |
| 4,461,011 A | 7/1984 | Lender et al. |
| 4,755,987 A * | 7/1988 | Lee et al. ................... 370/479 |
| 5,081,645 A * | 1/1992 | Resnikoff et al. ........... 375/146 |
| 5,712,866 A | 1/1998 | Stein et al. |
| 5,748,667 A | 5/1998 | Dyckman |
| 5,815,526 A | 9/1998 | Rice |
| 6,426,977 B1 * | 7/2002 | Lee et al. .................... 375/259 |

* cited by examiner

System Block Diagram for Conversion of Data into Noise Like Waveform

An Example of Digital Carrier Synchronous Modulation
with Two Half Cycles per Bit

Figure 4
Self-Synchronized Scrambler 8 and Descrambler
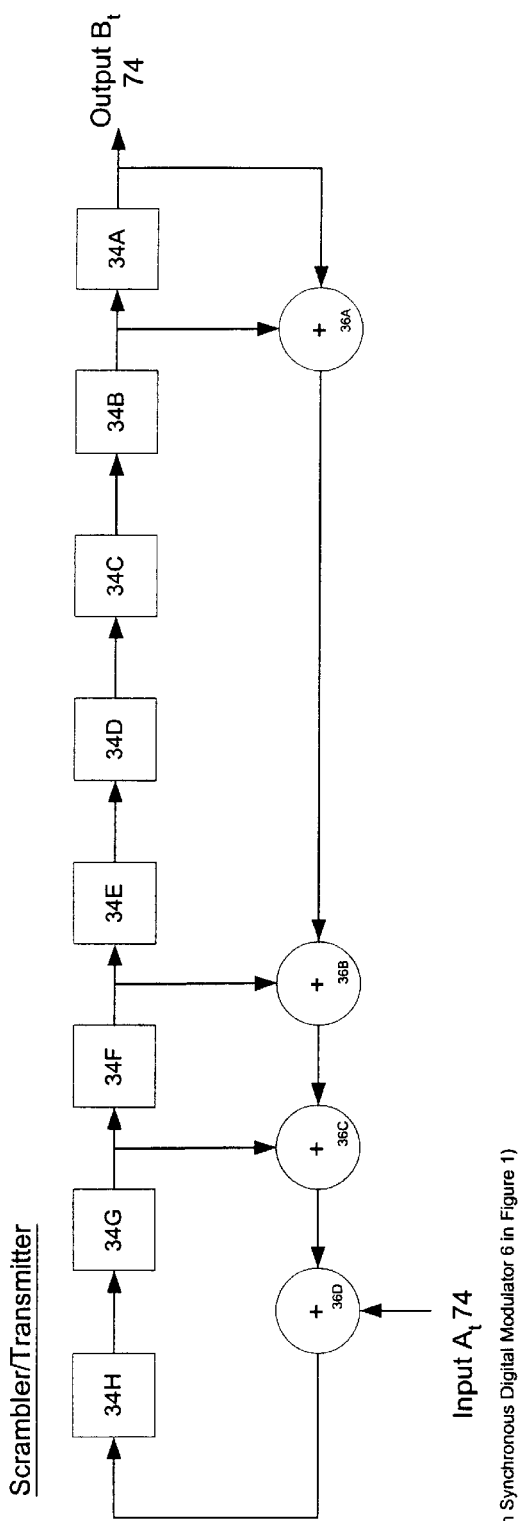
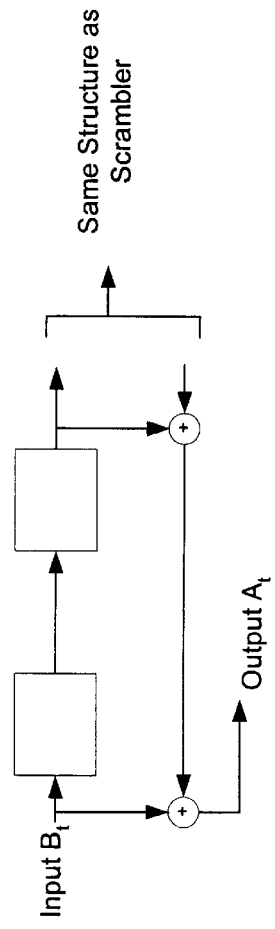

Direct Sequence Pseudo-Noise Spread Spectrum (DS-PNSS) Converter 10

Example of Gaussian Conversion L = 7

State Space Diagram for One Dimension; L=7

Gaussian Approximation for L = 7

System Block Diagram for an Alternate Embodiment for Conversion of Data Into Noise-Like Gaussian Waveform

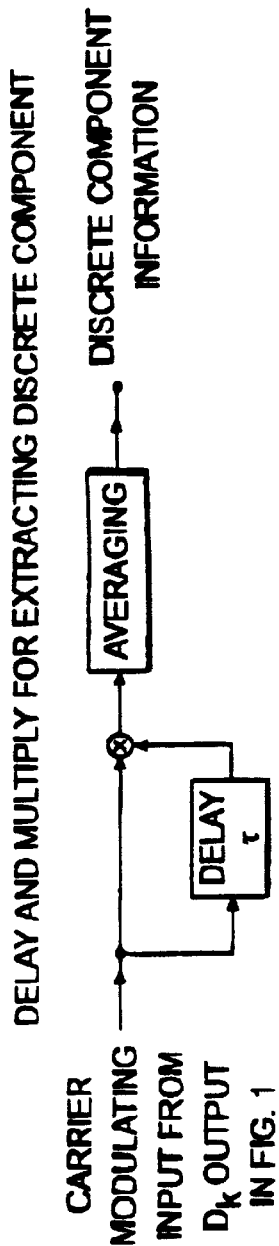

FIG. 11

DELAY AND MULTIPLY FOR EXTRACTING DISCRETE COMPONENT

NET RESULT AFTER AVERAGING $$\bar{X} = K_1 \int_{-\alpha}^{\alpha} Z(f) \cdot Z\left(\frac{1}{T_c} - f\right) df$$

WHERE $\bar{X}$ = AMPLITUDE
$K_1$ = CONSTANT
$Z(f)$ = SPECTRAL DENSITY
OF CARRIER MODULATING INPUT IS ALSO $[Z(\frac{1}{T_c} - f)]$ $\tau$ = SMALL DELAY BUT $\tau$ COULD BE ZERO
MATHEMATICAL ANALYSIS FOR THE ABOVE EXPRESSION
OMITTED CARRIER BUT IT IS VALID ALSO FOR CARRIERS $\frac{1}{T_c}$ = SPEED IN CHIPS PER SECOND AND $T_c$ = TIME INTERVAL IN SECONDS BETWEEN SUCCESSIVE CLOCK PULSES

SYSTEM AND METHOD FOR CONVERTING DATA INTO A NOISE-LIKE WAVEFORM

BACKGROUND

Field of the Invention

This invention is related to secure data transmission systems. In the prior art, digital data transmission systems were based on independent symbols and minimization of intersymbol interference (ISI). There is a universal use of direct sequence pseudo noise spread spectrum (DS-PN SS) techniques creating white spectral density. This approach is insufficient to create a waveform with the desired white and gaussian characteristics of noise in the natural environment. Such attributes assure the highest possible degree of privacy in communication transmissions.

Thus, it is desirable to create a communication system that achieves a higher degree of private transmissions than is presently available today.

SUMMARY OF THE INVENTION

This invention relates to secure data transmissions. Specifically, it is related to digital data communication systems that communicate digital data in a manner that makes nearly indistinguishable from noise, by giving the transmitted data white noise and gaussian characteristics. Noise-like signal generation is achieved by merging white noise characteristics of DS-PN SS techniques and a unique gaussian distribution technique in the time domain.

The basis for achieving the white noise and gaussian characteristics is the application of correlative techniques to the spread spectrum output. In the prior art, correlative techniques have been applied to high speed commercial transmissions and to magnetic disks for memory storage. The unique use of correlative techniques in this application allows for limited amounts of ISI, whereas the prior art teaches to drive the ISI to null. By effectively using correlative techniques, memory is built into the symbols, the symbols are dependent and have patterns that can be interpreted.

The system and method for converting digital data into a noise-like waveform utilizes a unique method of modulation that results in a system that makes it very hard or impossible to detect the information contained within the transmitted signal, or even detect the transmitted signal itself.

One object of the invention is to utilize spread spectrum technology in order to create output that is essentially white.

Another object of the invention is to provide additional security by randomizing the data and carrier.

A further object of the invention is to provide an output signal that combines white noise and a gaussian distribution to closely approximate actual noise; such a signal will have continuous spectrum and no discrete features.

Yet a further object of the invention is to lower the spectral density of the output signal by up to 3dB.

BRIEF DESCRIPTION OF THE DRAWINGS

FIG. 4 is a schematic block diagram of a self-synchronized scrambler and descrambler.

FIG. 11 schematically illustrates extracting discrete components from a signal using delay and multiply.

DETAILED DESCRIPTION OF THE PREFERRED EMBODIMENTS

Figure 1:
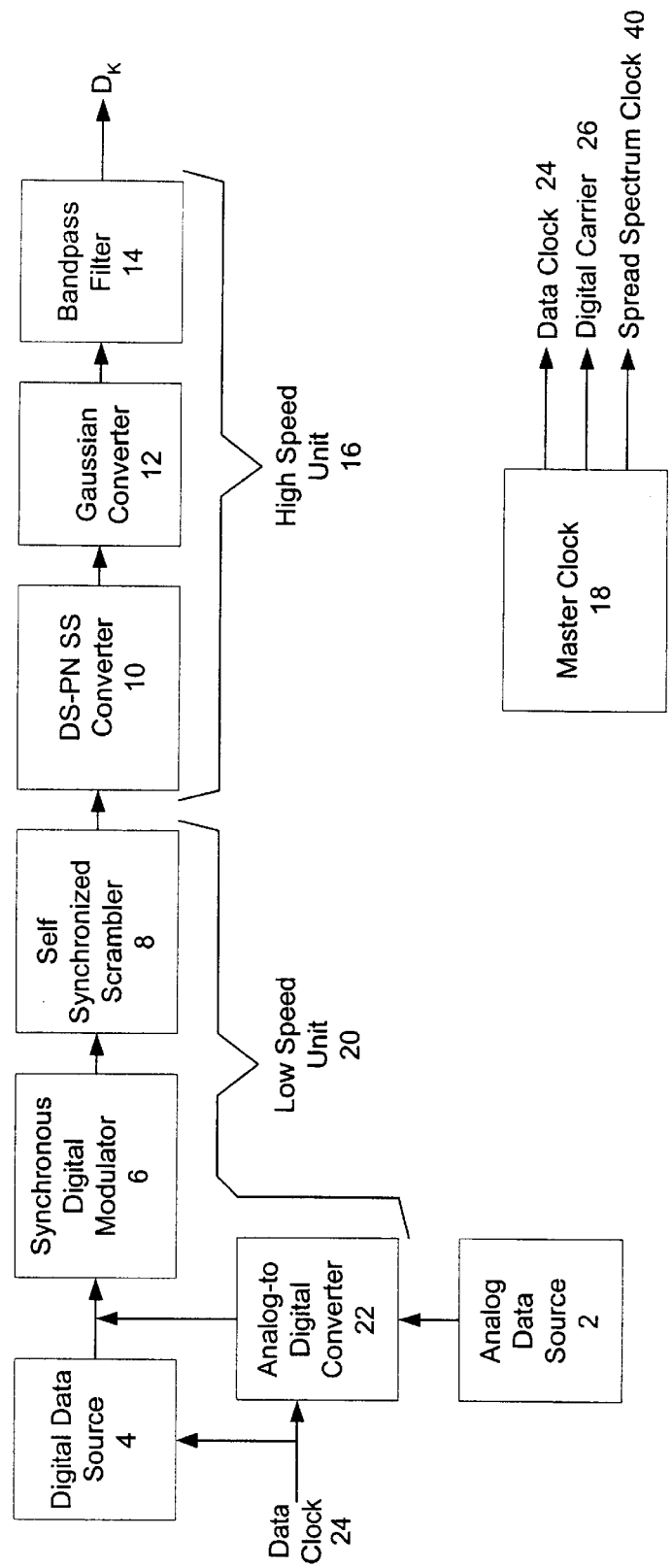
FIG. 1 is a system block diagram for conversion of data into a noise-like waveform according to a preferred embodiment of the invention.

FIG. 1 is a system block diagram for conversion of data into a noise-like waveform according to a preferred embodiment of the invention. In accordance with the preferred embodiment, a system for conversion of data into a noise-like waveform includes the following components:

- a digital data source 4 or an analog data source 2 and an analog to digital converter 22;
- a synchronous digital modulator 6;
- a self-synchronized scrambler 8;
- a direct-sequence pseudo noise spread spectrum converter 10;
- a gaussian converter 12; and a
- bandpass filter 14. The system for conversion of data into a noise-like waveform also can be characterized as having a low speed unit 20 and a high speed unit 16. These two units will be discussed below.

Data may be input to the system from one of two general sources: the first being an analog data source 2, the second a digital data source 4. If the data is input from the analog data source 2, the data is converted into a digital format by an analog-to-digital converter 22.

Figure 2:
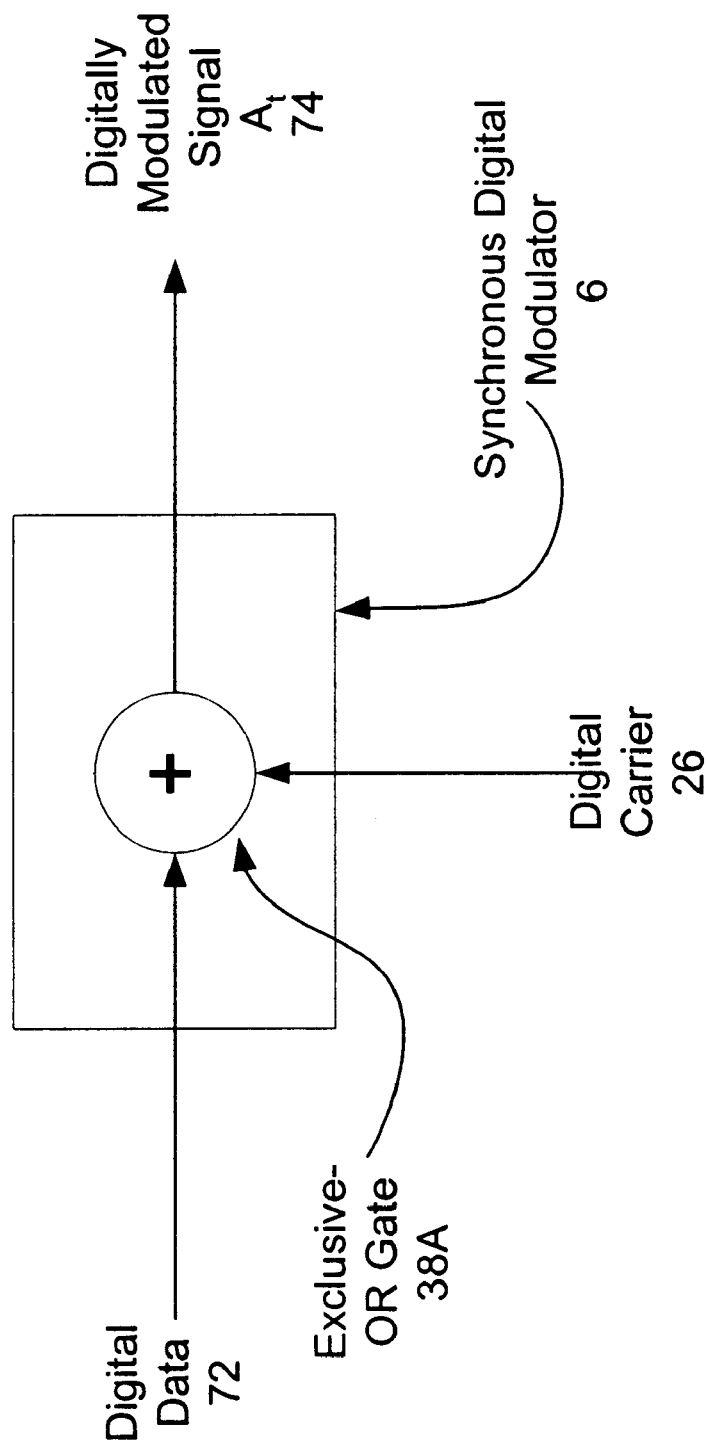
FIG. 2 is a schematic block diagram of a synchronous digital modulator.

FIG. 2 is a schematic block diagram of a synchronous digital modulator 6. Digital data 72, regardless of its source, is input into a synchronous digital modulator 6. The synchronous digital modulator 6 includes an EXCLUSIVE-OR (EX-OR) gate 38A. It will be understood by those skilled in the art that that EX-OR function can be implemented in a number of ways, and that the EX-OR logic function is the same as modulo 2 binary addition without accounting for any carry. A first input of EX-OR gate 38A receives the digital data 72 and a second input receives a clock signal that functions as a digital carrier 26. In the preferred embodiment, all the clock signals are generated from a master clock 18 shown in FIG. 1. The master clock 18 generates a data clock 4, which is used by the digital data source 4 or the analog-to-digital converter 22; a digital carrier 26 for the synchronous digital modulator 6, and also a spread spectrum faster clock 40, in FIG. 5 used in direct-sequence pseudo noise spread spectrum converter 10.

Figure 3:
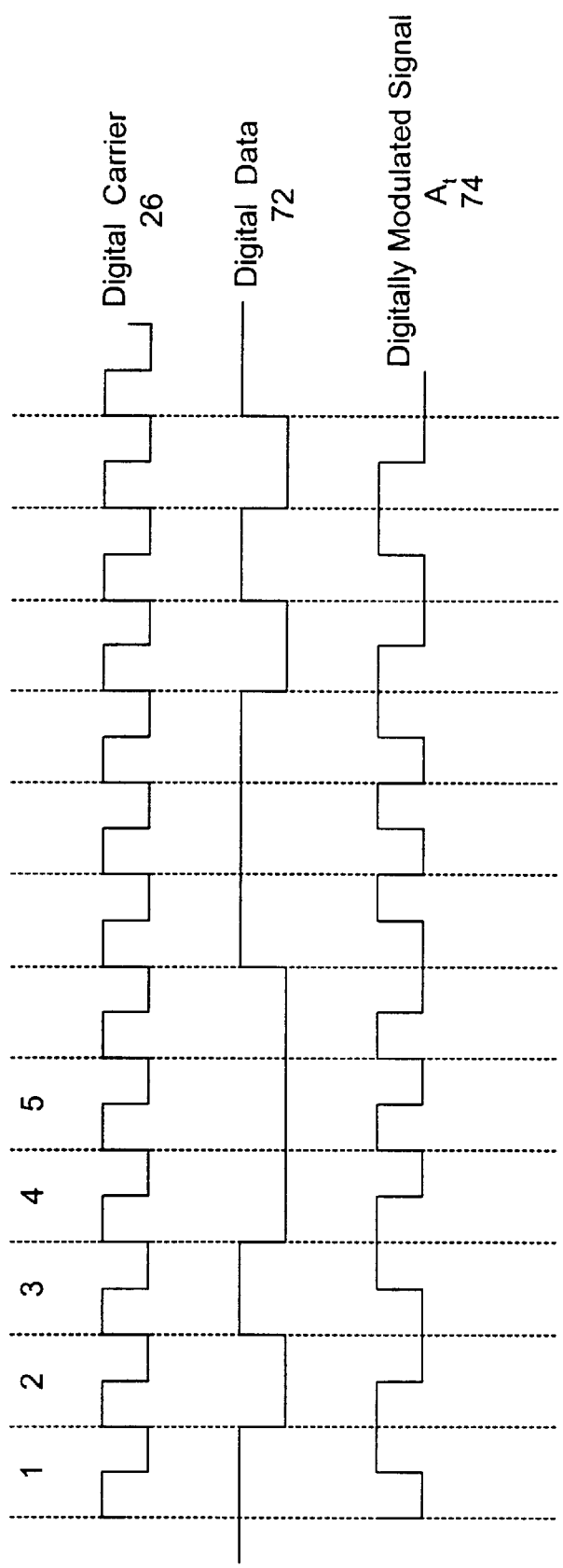
FIG. 3 shows an example waveform for the output of the synchronous digital modulator.

FIG. 3 shows an example waveform for the output of the synchronous digital modulator 6. The output of the synchronous digital modulator 6 is a digitally modulated signal, $A_t$, labeled as 74 in FIG. 2. In FIG. 3, several clock cycles are numbered. In the first clock cycle, it can be seen that the digital carrier experiences a period of time when the signal level is high, and a period of time when the signal level is low. These periods can be referred to as a logic level 1 and logic level 0, respectively. For each cycle of the digital carrier 26, the digital data 72 is at one logic level or the other. For example, in the first digital carrier 26 cycle, the logic level is 1, in the second it is a logic 0, and in the third it is a logic 1.

The Digitally Modulated Signal, $A_t$, function is a logic 0 in FIG. 3 when carrier and data are at the same logic level, otherwise is a logic 1. For example, in the first half of the digital carrier 26 cycle, the logic level is 1. The data for that time period is also 1, and when the EX-OR function is applied to those two logic levels, the result is a 0, which can be seen on the line entitled "digitally modulated signal". Then during the second portion of the digital carrier 26 cycle, the logic level of the digital carrier 26 is a 0, while the data is still 1; this creates an exclusive-or output of 1. This process continues indefinitely while data and the digital carrier are present. The waveform shown in FIG. 3 is also known as binary phase shift keying (BPSK).

BPSK shifts the phase of the carrier (in this instance a digital carrier 26) 180 degrees when there is a change in sign of the data. Note that other modulation schemes may be used, such as: quadrature phase shift keying (QPSK), and others. The only restriction is that the digital form in the preferred embodiment requires that the number of half cycles of the digital carrier 26 per data bit, is an integer.

FIG. 4 is a schematic block diagram of a self-synchronized scrambler 8 and descrambler. Referring to FIG. 1, the output of the synchronous digital modulator 6, is input to the self synchronized scrambler 8. The self synchronized scrambler 8 works as follows.

Shift registers are well known in the art. Data present at the input a certain period of time prior to either a trailing or rising edge (logic 0 or 1) of a clock pulse, is latched into the shift register. The shift register has multiple shift register elements (34A–H), each with its own output. On the first clock pulse, the data present at the input will be latched in and become present at the output of the first shift register element 34H. After the next clock pulse, that data becomes present at the output of the second shift register element 34G, and so on, until it reaches the last shift register element output 34A.

In the preferred embodiment of the invention, the self-synchronized scrambler 8 uses the second, third and seventh outputs of the shift register 34. Data present at the input of the first shift register element 34H before a first clock pulse reaches the output of the seventh shift register element 34B on the seventh clock pulse.

The output $B_t$ 74 of the self-synchronized scrambler 8 in FIG. 4 is the output of the eighth shift register element 34A. $B_t$ 74 is one input to the direct sequence pseudo noise spread spectrum converter 10 in FIG. 5. $B_t$ 74 is also connected to a first input of a feedback EX-OR gate 36A in FIG. 4. A second input of the EX-OR gate 36A is connected to the output of the seventh shift register element 34B. The EX-OR gate 36A has a first output, connected to a first input of an EX-OR gate 36B. The EX-OR gate 36B has a second input connected to the third shift register element 34 F output of the shift register 34.

The EX-OR gate 36B has a first output connected to a first input of an EX-OR gate 36C. The EX-OR gate 36C has a second input connected to the second shift register element 34G output of the shift register 34. The EX-OR gate 36C has a first output connected to a second input of the EX-OR gate 36D, and the EX-OR gate 36D has a first input connected to receive $A_t$ 74, which corresponds to the output of the synchronous digital modulator 6, FIG. 2. EX-OR gate 36D has a first output connected to the input of the first shift register element 34H of shift register 34.

It can be seen, therefore, that old data is constantly "mixed" with the new data in a process known as "scrambling." The input data is randomized, yet the original values are not lost. The use of scramblers in this fashion is well known in the art.

The self synchronized scrambler 8 randomizes both the data and the BPSK carrier. That is why a digital carrier is used. This randomization is essential to noise-like communication systems. In the preferred embodiment, the self synchronized scrambler 8 has a maximal length of 255 bits. The maximal length is the length, or number of bits that is output from the scrambler before the sequence begins to repeat itself. In other words, the output from the scrambler forms a word that is 255 bits in length. The pattern repeats itself after 255 bits. The maximal length is a function of where the feedback units are placed in the shift register configuration, and is also dependent upon the number N of shift registers.

In the example shown in FIG. 4, the maximal length is 255, according to the following relationship:

Maximal Length=$2^N-1$

Maximal Length=$2^8-1$; which yields 256−1=255 (0 is never used).

The positioning of the feedback elements—36A–D, is precisely placed. Such positioning is known in the technical literature, as exemplified by F. J. Mac Williams and N. J. Sloane, "Pseudo-Random Sequences and Arrays," Proceedings of the IEEE, Vol. 64, No.12, December 1976, pp. 1715–1729. The following equations define the relationship between the input to the scrambler $A_t$, and the output, $B_t$.

$$A_t = \text{Input to scrambler} \qquad (1)$$

$$B_t = \text{Output of scrambler} \qquad (2)$$

$$A_t = B_t \oplus \sum_{i \leq 1} g_i B_{t-1} \bmod 2 \qquad (3)$$

$$B_t = A_t \oplus \sum_{i \leq 1} g_i B_{t-i} \bmod 2 \qquad (4)$$

where $g_i = 0$ or $1$

Self-synchronization follows FIG. 4 and equations (1) throughout (4) on page 9. Equation (3) represents the function of a scrambler with an input $A_t$ and an output $B_t$. Descrambler, which is identical to scrambler, can be represented by equation (4) provided that $A_t$ is substituted by $$\left( A_t \oplus \sum_{i \leq} g_i B_{t-i} \bmod 2 \right)$$

as input. If so, then the output of the descrambler is $$\left( A_t \oplus \sum_{i \leq 1} g_i B_{t-i} \bmod 2 \right) \oplus \sum_{i \leq 1} g_i B_{t-i} \bmod 2 \qquad (5)$$

as per equation (4). The above equation (5) contains $A_t$ plus two identical terms—all added modulo 2 which is the same logic function as can be performed by an EX-OR gate.

Consequently the last two terms are identically zero and the remaining term in (5) is $A_t$ as expected since the circuits in FIG. 4 for scrambler and descrambler are identical. All this is automatically practiced as the incoming waveform from the scrambler slides through the fixed descrambler. Self-synchronization occurs at the synchronization instant and $A_t$ is delivered at the output of descrambler.

Increasing the number of register stages increases the maximal length and provides a greater degree of security in transmission of the digital signal. The order of magnitude of the maximal length can be in the thousands. The actual maximal length depends on the specific application of the embodiment of the invention. Therefore the preferred embodiment of the invention does not require a specific maximal length.

The following elements in FIG. 1 can be considered part of the low speed unit 20: digital data source 4 (or analog data source 2 and analog-to-digital converter 22), synchronous digital modulator 6 and self-synchronized scrambler 8. The following components can be considered part of the high speed unit 16: DS-PN SS converter 10, gaussian converter 12 and bandpass filter 14. The difference between the low speed unit 20 and high speed unit 16 is the ratio of clock frequencies. Typically, the ratio of the frequency of the high speed clock to low speed clock can be on the order of 1000:1 or more. The clock that is used in the high speed unit is referred to as $F_C$, with a period of $T_C$ seconds and $F_C=1/T_C$ chips per second for DS-PN SS.

Figure 5:
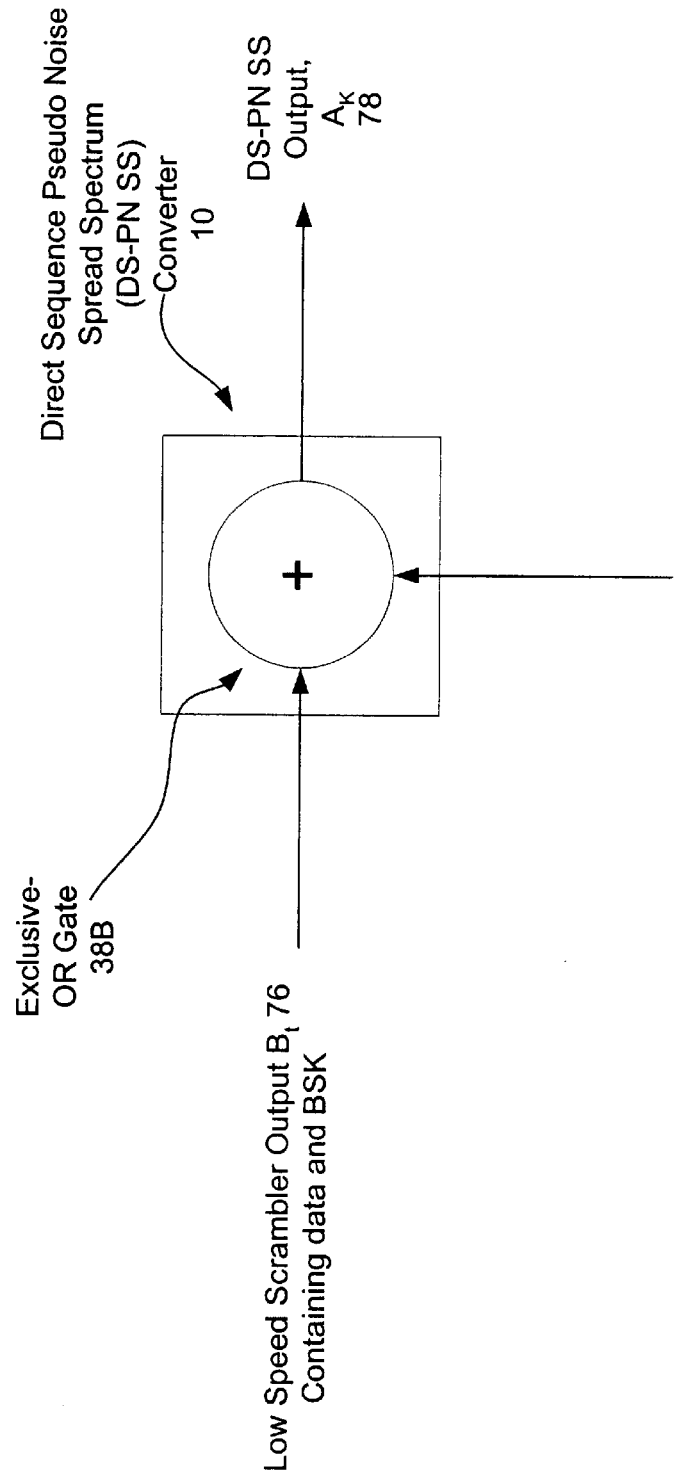
FIG. 5 is a schematic block diagram of a direct-sequence pseudo noise spread spectrum converter.

"Referring to FIGS. 1 and 4, the output of the self-synchronized scrambler 8, Bt 74 is input to the direct sequence pseudo noise spread spectrum DS-PN SS) converter 10. FIG. 5 is a schematic block diagram of a direct sequence pseudo noise spread spectrum converter 10. The DS-PN SS converter 10 comprises an EX-OR gate 383. A first input of the EX-OR gate 38B receives the output Bt 74 of the self-synchronized scrambler 8, and a second input receives a high speed maximal length spread spectrum PN sequence from a high speed maximal length shift register driven by the spread spectrum clock 40. The output of the DS-PN SS converter 10 is a signal, AK, 78. This output has white noise characteristics, i.e. has a relatively flat spectral density. The signal is not yet gaussian and it still contains continuous and discrete components. A discrete component is the spread spectrum clock signal."

Figure 6:
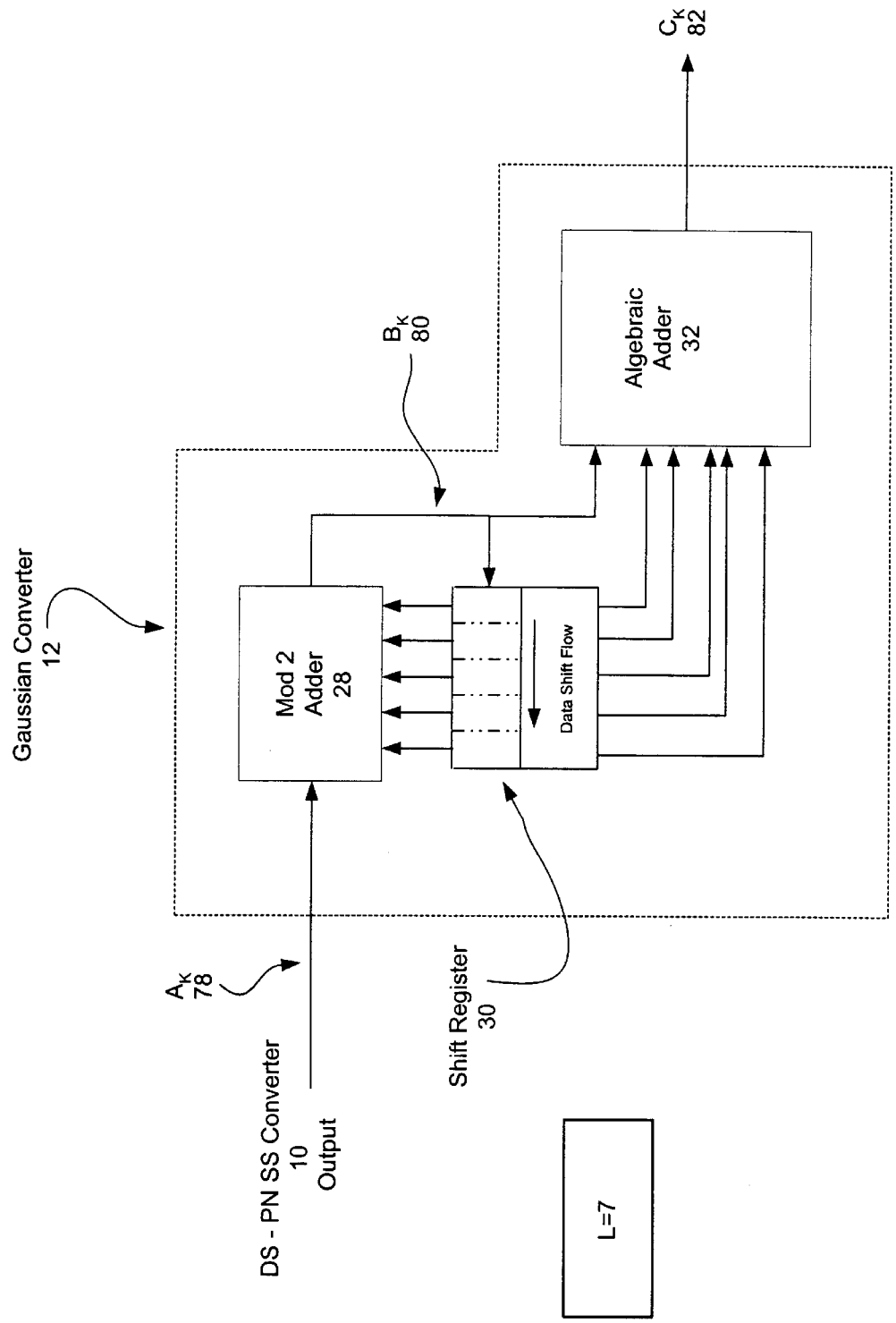
FIG. 6 is a schematic block diagram of a gaussian converter.

FIG. 6 is a schematic block diagram of a gaussian converter. 12 in FIG. 1. The gaussian converter 12 comprises a modulo-2 adder 28, a shift register 30 and an algebraic adder 32. The operation of the gaussian converter 12 is synchronous; that is, all operations are synchronized with either a falling or rising edge of a clock signal.

To insert memory into the spread spectrum signal $A_K$ 78, an (L-2) stage shift register 30, operating at a spread spectrum speed of $F_c$ chips per second. The terminology "chips" is reserved for high speed spread spectrum technology to distinguish it from "bits" used for the "low speed" world, as previously discussed. The subscript "C" in $F_C$ and $T_C$ represents "chips." As a first step, $A_K$ 78 is converted into $B_K$ 80. $B_K$ 80 is the encoded version of $A_K$ 78. The purpose of such coding is to facilitate identification of the chips at the receiving end. The inherent memory for each chip is built into each chip; such memory causes error propagation in decoding via $A_K$. Previous chips are not needed to decode the current chip when $B_K$ is used rather than $A_K$. As a result, the probability of error, $P_e$, is reduced, especially in noisy channel transmissions.

The output from the DS-PN SS converter 10, $A_K$ 78 is connected to a first input of the modulo 2 adder 28. A modulo 2 adder has a plurality of inputs, each receiving a chip from some source. The modulo 2 adder has a single output, $B_K$ 80, which represents the modulo 2 sum of all six chips present at the inputs. For each clock period, a new sum is generated. As is well known in the art, if the number of logic level 1 chips present at the input of the modulo 2 adder is odd, the modulo 2 adder sum will be a 1, and if the number of logic level 1 chips is even, the output will be a 0. For example, if the logic levels at the inputs were 101010 (odd number of 1's) the modulo 2 sum would be 1. Likewise, if the logic levels at the input were 101011 (even number of 1's), the modulo 2 output would be 0.

Figure 7:
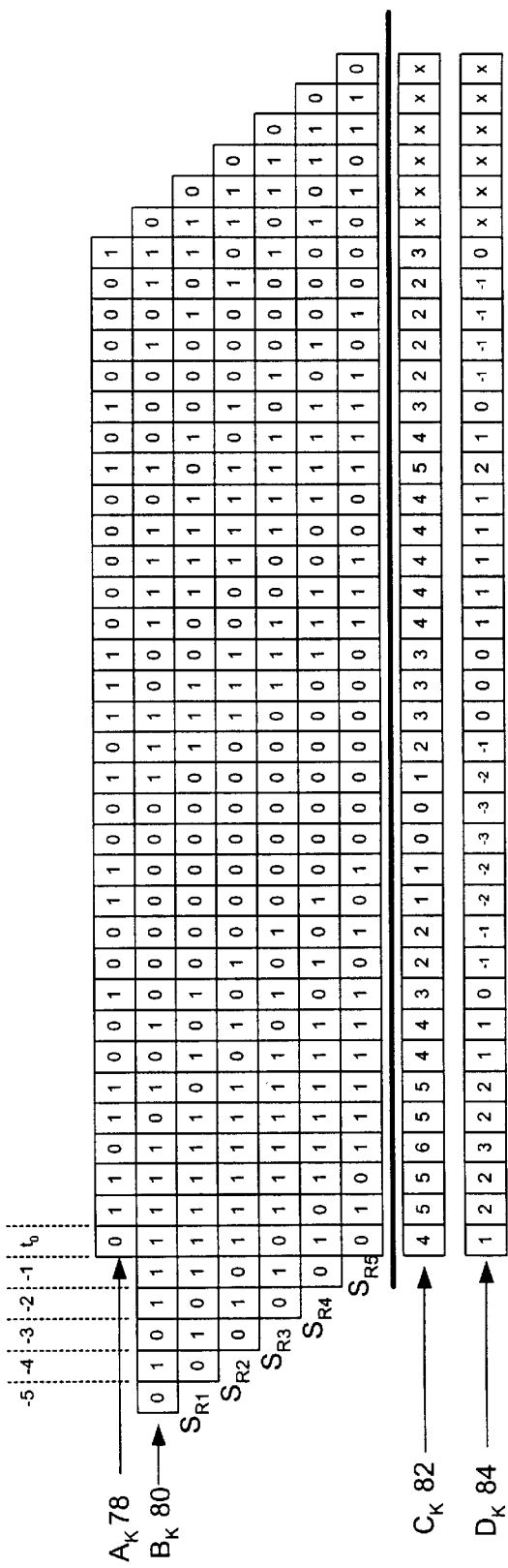
FIG. 7 schematically illustrates an example of a gaussian conversion of a digital signal.

Referring to FIG. 6, an algebraic sum of $C_K$ 82 is produced, which creates L levels (seven in this case) of correlative chip trains. The correlative concept is based on permitting controlled amount of intersymbol interference (ISI) rather than attempting to eliminate it as is done in conventional binary or multilevel digital systems known as Nyquist type (H. Nyquist, "Certain Topics In Telegraph Transmission Theory," Bell Telephone Laboratories, Inc. Reprint B-331, August 1928) such as BPSK or QPSK. ISI results from preceding and succeeding pulse tails interfering at the sampling instant of a pulse. The net result of allowing some ISI is correlation between successive pulses within the limited group of digits. One of the benefits is white Gaussian characteristic. Another property is substantial increase of symbols per second speed for a fixed bandwidth compared to Nyquist type systems. Further, since correlative pulse trains are not independent, predetermined patterns exist. Violations of such patterns due to interference can be detected. Thus error detection can be accomplished without introducing redundant digits at the transmitter. The patterns are: one successive chip can go one level up or down or stay at the same level relative to previous chip. This is illustrated in FIG. 7 at the row labeled $C_K$ 82. Another property of correlative is absence of discrete components at a clock frequency. This is discussed below and depicted in FIGS. 11 and 12. Example references discussing correlative signal processing are A. Lender, "Correlative (Partial Response) Techniques and Applications," Chapter 7, pp. 144–183, Digital Communications: Microwave Applications, K.Feher ed. Prentice-Hall, Inc. 1981, which is more general; S Pasupathy, "Correlative Line Coding (Partial Response Signaling) Techniques," The Froelich/Kent Encyclopedia of Telecommunications, Editor-In-Chief Fritz Froelich, pp. 483–499, Marcel Dekker, Inc. 1992, with easy presentation; and A. Lender, "Correlative Digital Communication Techniques," IEEE Transactions, pp. 128–135, December 1964, which is mathematically, oriented.

FIG. 6 shows several different signals, which are defined below:

$A_K$ 78=DS-PN SS binary input to Gaussian converter $A_K 78 = $ DS-PN SS binary input to Gaussian converter $$B_K 80 = A_K \oplus \sum_{n=1}^{5} B_{n-1} \text{mod 2 encoded chip pulse train}$$

$$C_K 82 =$$

$$\sum_{n=1}^{6} B_{k-n} \text{ algebraic seven level } (L=7) \text{ output of Gaussian converter}$$

$$A_K 78 = C_K \text{mod } 2 = \left[ \sum_{n=1}^{6} B_{k-n} \text{algebraic} \right] \text{mod } 2$$

The output, $B_K$ 80, of the modulo 2 adder 28 is connected to an input of the shift register 30, and to a first input of the algebraic adder 32. In the preferred embodiment, the shift register 30 has five stages, with output taps 1–5 after each shift register stage. The modulo 2 adder 28 has six inputs; a first input connected to receive the DS-PN SS converter 10 output, $A_K$ 78, and five parallel inputs from the shift register 30 output taps 1–5, respectively. The signal $B_K$ 80 is serially fed back to shift register 30 as shown in the FIG. 6 example.

The shift register 30 output taps 1–5 are also connected to the algebraic adder 32. The algebraic adder 32 sums the number of logic level 1's that are present and creates a number representing that sum. For example, if the six inputs to the algebraic adder 32 are 101010, the output of the algebraic adder would be 3 (if the input was 101110, the output of the algebraic adder 32 would be 4, and so on). The output of the algebraic adder 32, $C_K$ 82, is the output of the gaussian converter 12 in FIG. 1. It is also useful to describe the output of the modulo 2 adder 28, $B_K$ 80 as will become apparent below.

In FIG. 6, $B_K$ 80 is formed by adding, in modulo 2 fashion, a single $A_K$ 78 chip to the outputs of the shift register 30 which are present at the inputs of the modulo 2 adder 28.

FIG. 7 schematically illustrates an example of a gaussian conversion of a digital signal. The first row of FIG. 7 shows the signal $A_K$ 78, which is the input to the gaussian converter 12 in FIG. 1. In the column labeled to, $A_K$ 78=0; note that there are columns labeled −1, −2, −3, −4 and −5: these are previous $B_K$'s 80 calculated by the modulo 2 adder 28. The fifth previous $B_K$ 80 with respect to the present $A_K$ 78 input of 0, in the column $t_0$, is shown at the column labeled −5. That is the output at the end of the shift register 30, or the fifth output tap. This can be represented by the following expression.

$$B_K = A_K \oplus \sum_{l}^{5} B_{n-1} \mod 2$$

The fourth previous $B_K$ 80 is shown at the column labeled −4. That is the output of the fourth tap of the shift register 30. This occurs because of the nature of the shift register. It takes the previously calculated $B_K$ 80, and shifts it in time, keeping it for five clock periods. At the end of each clock period, a new $B_K$ 80 is shifted in, the previous $B_K$ 80 is shifted along, and earlier previous $B_K$'s 80 are shifted as well. The result is at column $t_0$ $A_K$ 78=0, and the outputs of the shift register 30 are 11010. The modulo 2 adder 28 adds the chips 011010 and the sum is 1, which is shown in the row labeled $B_K$ 80, column $t_0$. These signals and the new $B_K$ 80, are presented to the algebraic adder 32. The input then to the algebraic adder is 111010. The output of the algebraic adder is 4 (because there are four 1's).

As a result of the unique arrangement of the modulo 2 adder 28, shift register 30 and algebraic adder 32, in FIG. 6 each symbol output by the gaussian converter, $C_K$ 82, is independent of the previous and subsequent symbols. The output is called a symbol. Even though the output has the same time duration as a chip, it represents more information than the binary chip (0 or 1) and so is given a separate identity. The independence of the output signal is created because memory is built into each symbol and each can be decoded separately from any others. As a result, if there is an error in any one symbol, i.e. it is received as a different symbol than was transmitted, it will not affect any other symbols.

In order to arrive at $D_K$ 84, in FIG. 7, 3 is subtracted from $C_K$ 82 by introducing appropriate bias. $D_K$ 84 is the output of bandpass filter 14 shown in FIG. 1.

The output waveform distribution of the gaussian converter 12 is, as its name implies, gaussian. The six inputs to the algebraic adder 32 are effectively random binary pulses and each pulse train has a uniform distribution. This means that no one binary pulse is more likely to occur than any other binary pulse. Algebraic additions of such pulse trains approaches gaussian distributions. The more chip trains utilized (i.e. 7, 8, 9 or more inputs to the algebraic adder), the closer the output approaches an ideal gaussian distribution. In this case, as an example only, 7 levels are used, and that is sufficiently accurate.

For the gaussian converter 12 shown in FIG. 6, the number of levels generated is seven. An individual level is the symbol number that is generated by the algebraic adder 32. In this instance, as the table in FIG. 7 shows, there are seven possible outcomes in $D_K$ 84 from the algebraic adder: −3, −2, −1, 0, 1, 2 3. These levels, or numbers, are related to the construction of the gaussian converter 12, by the following:

Number of Shift Register Elements=L−2.

In this example, it is desired to have seven levels, which, in the preferred embodiment, requires five shift register elements.

Figure 8:
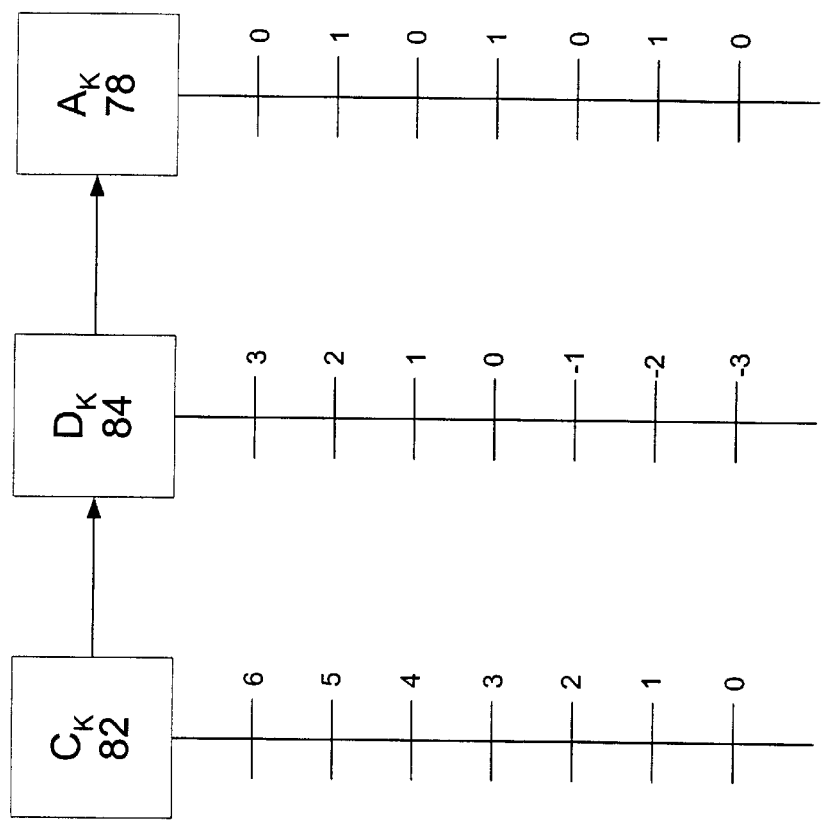
FIG. 8 is a state-space diagram for a one dimensional, L=7 noise-like data transmission system.

FIG. 8 is a state-space diagram for a one dimensional, L=7 noise-like data transmission system. As discussed above, there is a relationship between $C_K$, $D_K$ and $A_K$. $D_K$ is formed by subtracting 3 from $C_K$. The bandpass filter 14 in FIG. 1 accomplishes this function. The following relationships are then true:

$A_K$ 78=$C_K$mod2

$A_K$ 78=$D_K$mod2−(Binary inverse of $D_K$mod2.)

Figure 12:
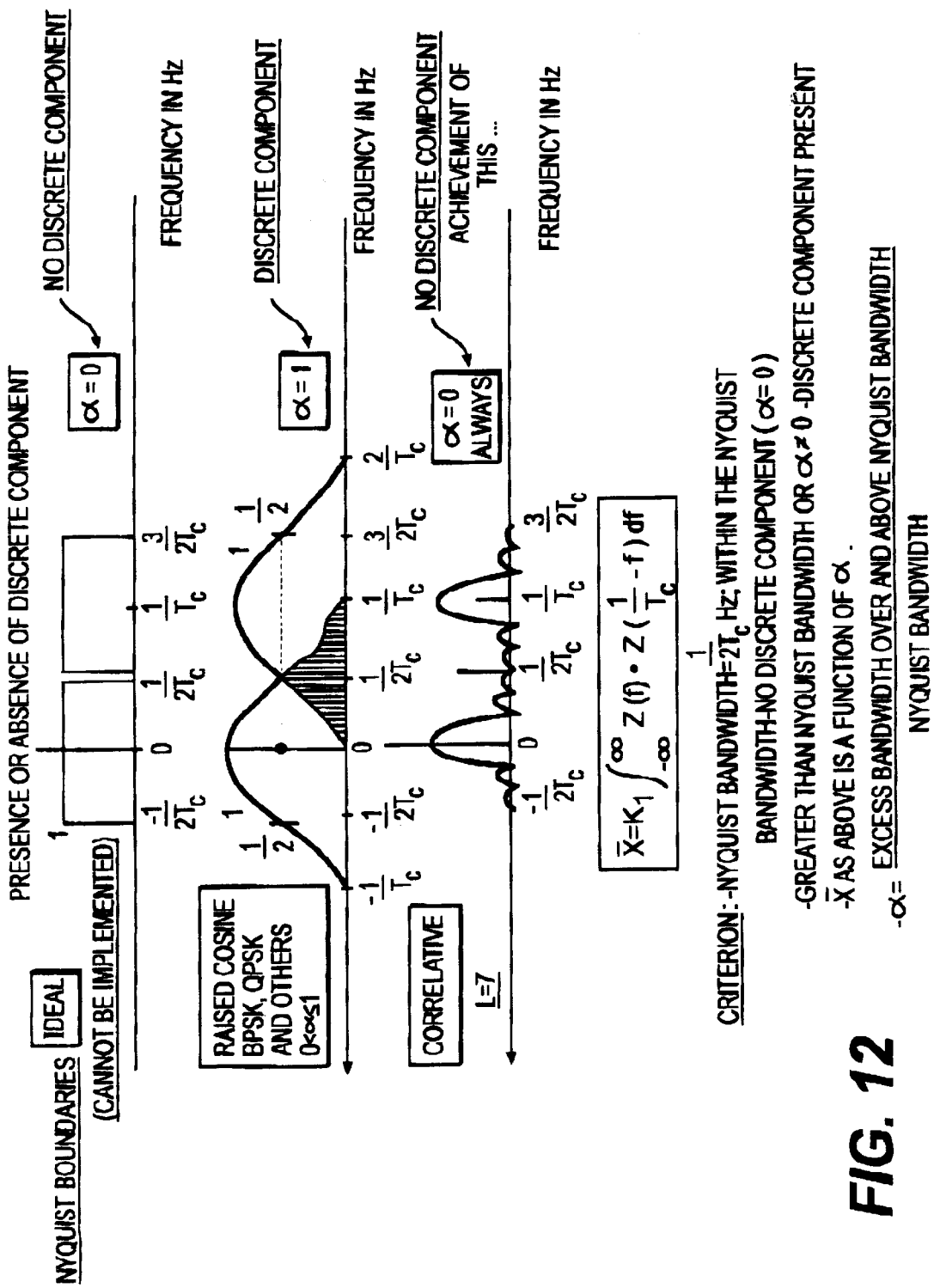
FIG. 12 graphically illustrates the presence and absence of discrete signal components.

One of the key and unique characteristics of the noise-like signal described here is that only continuous spectral component exists and the discrete component is absent. The reason is spectral density related to Nyquist criteria on rolloffs and inherent properties of correlative techniques. At this point it is appropriate to discuss absence of discrete component in correlative systems. This attribute is of utmost importance for noise-like characteristics of white Gaussian properties. The well-known detector in searching for discrete component is delay and multiply followed by averaging as depicted in FIG. 11. Mathematics is complex and its net result appears in FIG. 11 It is:

$$\overline{X} = K_1 \int_{\infty}^{\infty} z(f) \cdot z\left(\frac{1}{T_c} - f\right) df \tag{6}$$

where $\overline{X}$ is magnitude, $K_1$ is constant and the two integrands are spectral densities of "multiply" in FIG. 11. It is clear from above equation that $\overline{X}$ is zero when the integrand components do not have common overlapping area. If so, $\overline{X}$ then discrete component is absent. FIG. 12 graphically depicts conditions of the equations for $\overline{X}$. It is based on Nyquist criteria in H. Nyquist, "Certain Topics In Telegraph Transmission Theory," Bell Telephone Laboratories, Inc. Reprint B-331, August 1928. The first waveform in FIG. 12 depicts rectangular spectral density properties with Nyquist baseband bandwidth ½$T_c$ Hz and α=0 and the second with α≠0. Parameter α

$$\alpha = \frac{\text{excess bandwidth over Nyquist bandwidth}}{\text{Nyquist bandwidth}} \text{ and } \leq \alpha \leq 1$$

The top waveform in FIG. 12 illustrates Nyquist bandwidth. It cannot possibly have discrete component—the spectra are disjointed. But anyway Nyquist bandwidth spectrum cannot be physically implemented. Therefore all present systems such as BPSK, QPSK, MSK and others follow Nyquist second criteria with wider bandwidth, such as middle waveform in FIG. 12, with raised cosine shaping and $\alpha=1$. Any system with $\alpha \neq 0$ has common area (shaded) in equation (6) and FIG. 12 and has discrete component. The only exception is correlative. For correlative, Nyquist criteria are not violated as well as equation (6). All have Nyquist bandwidth and $\alpha=0$. This is shown in FIG. 12—the last spectrum for L=7 where L is number of levels. The spectral density of correlative in FIG. 12 is:

$$H(f) = \left| \frac{\sin(L-1)\pi f T_c}{\sin \pi f T_c} \right| \text{ for } f \leq \frac{1}{2T_c} \text{ and zero beyond} \quad (7)$$

In this respect, H(f) in equation (7) is spectral density of correlative 7-level system and has no discrete component. To generalize, all correlative systems are unique in the sense of having Nyquist bandwidth $\frac{1}{2}T_c$ and $\alpha=0$ and absence of discrete spectral component.

Going back to FIG. 8, when $C_K$ 82 equals 6, this corresponds to the following inputs at the algebraic adder 32 at FIG. 6: 1111111. If the same logic values constituted input to the modulo 2 adder 28 in FIG. 6, the output would be 0, because there are an even number of 0's. Thus, it can be shown for every $C_K$ 82 there is a corresponding $D_K$ 84 and $A_K$ 78. Also, the relationship between $A_k$ 78 and $D_k$ 84 is invariant to 180° rotation. That is, a $D_K$ 84 of 3 has the same $A_k$ 78 as a $D_k$ 84 of –3.

Figure 9:
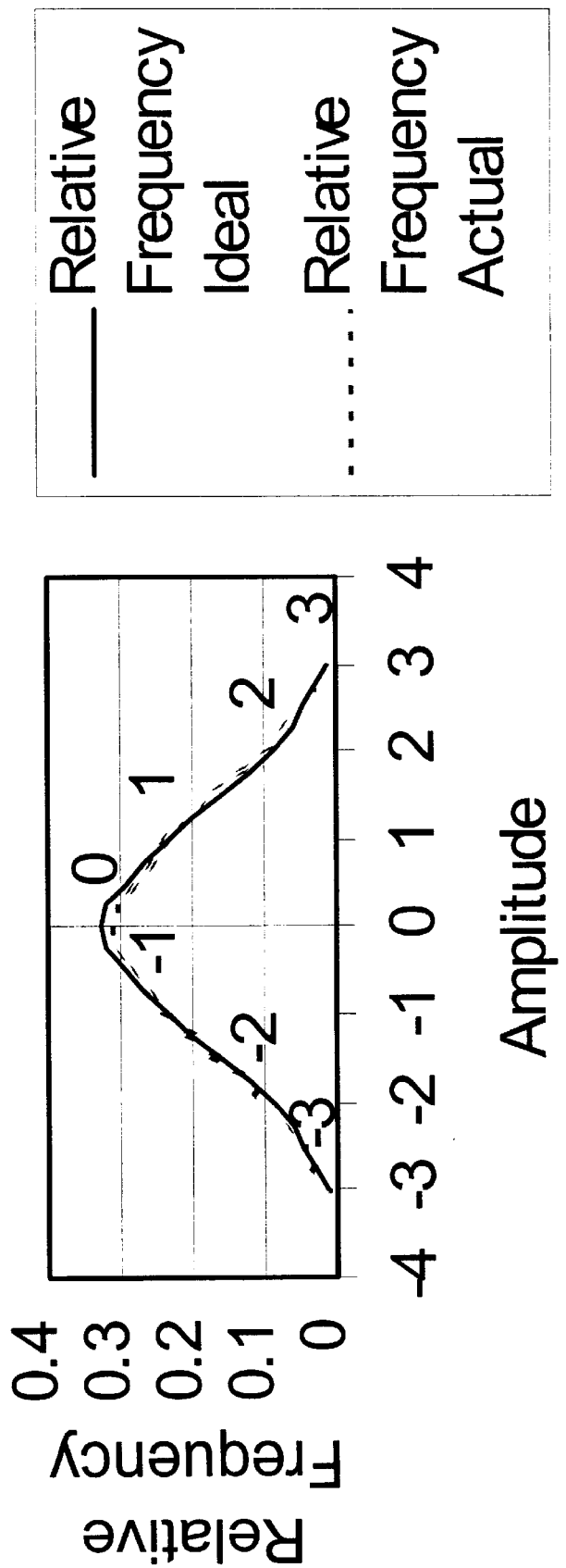
FIG. 9 is a graph depicting a gaussian distribution for the levels in the preferred embodiment of the invention.

FIG. 9 is a graph depicting a gaussian distribution for the levels in the preferred embodiment of the invention, and the actual distribution. The table below lists the actual and ideal results for an L=7 system for converting digital data into a noise-like waveform.

| Level | Ideal | Actual | Percent Deviation from Ideal |
|---|---|---|---|
| 3 | .0162 | .0156 | 3.7 |
| 2 | .0859 | .0937 | –9.0 |
| 1 | .233 | .234 | –0.4 |
| 0 | .326 | .313 | 4.0 |
| –1 | .233 | .234 | –0.4 |
| –2 | .0859 | .0937 | –9.0 |
| –3 | .0162 | .0156 | 3.7 |

The graph in FIG. 9 is characterized by the following relationships:

$$p(x) = \frac{e^{-x^2/2\sigma^2}}{\sigma\sqrt{2\pi}}$$

$\sigma^2 = 1.5$
L=7

Figure 10:
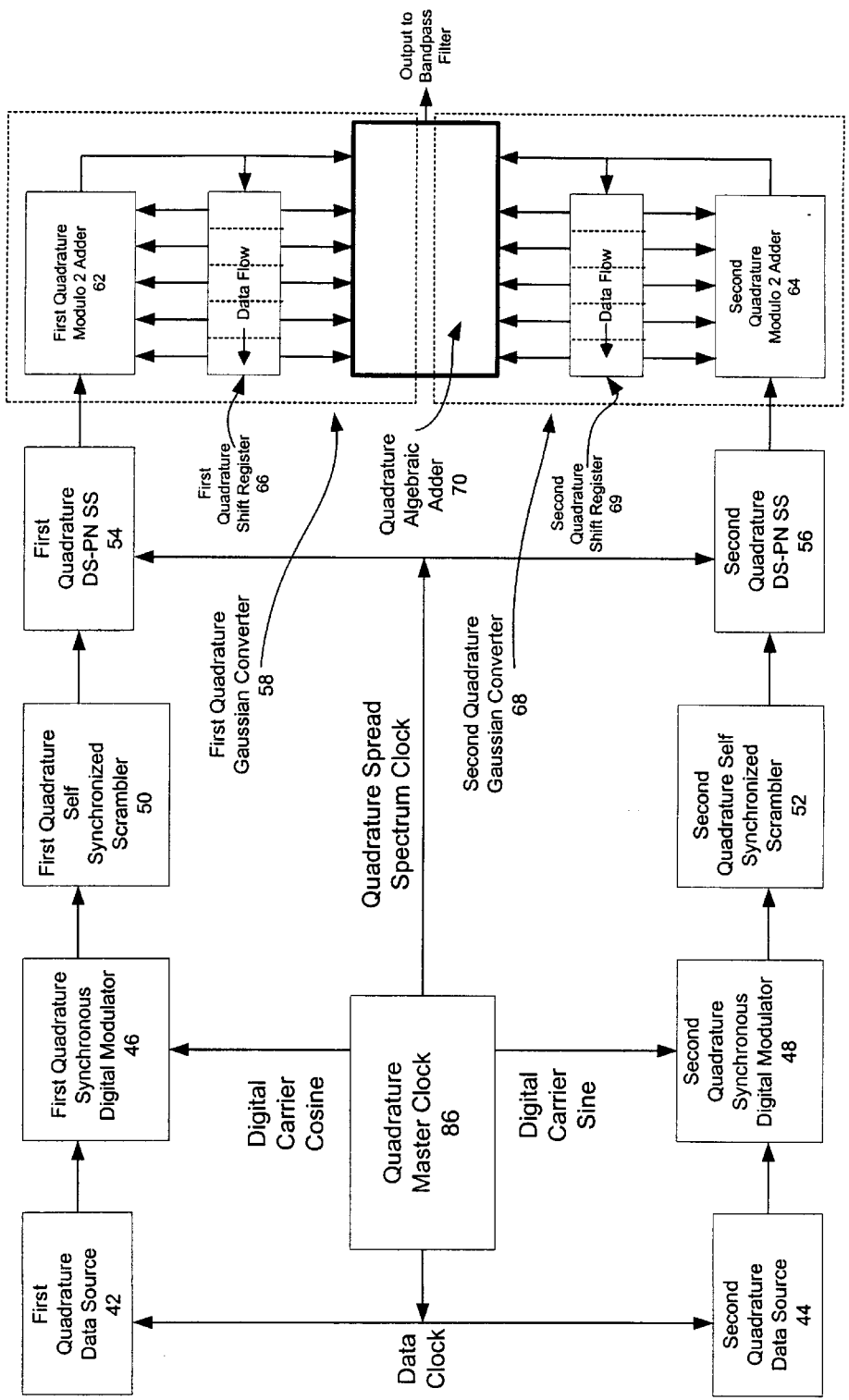
FIG. 10 is a schematic block diagram of a system for conversion in two dimensions of two independent data sources into a noise like waveform, according to an alternate embodiment of the invention.

FIG. 10 is a schematic block diagram of a system for conversion in two dimensions of two independent data sources into a noise like waveform, according to an alternate embodiment of the invention. Two different information sources are transmitted. The entire system is synchronous based on a quadrature master clock 86. There is a first quadrature data source 42 with an output connected to a first quadrature synchronous digital modulator 46. The first quadrature synchronous digital modulator 46 has a first output connected to a first quadrature self synchronized scrambler 50. The first quadrature self synchronized scrambler 50 has a first output connected to a first quadrature DS-PN SS converter 54. The first quadrature DS-PN SS converter 54 has its output connected to a first quadrature gaussian converter 58 which includes first quadrature modulo 2 adder 62, first quadrature shift register 66 and quadrature algebraic adder 70 up to the output bandpass filter.

The second half of the quadrature system is similar to the first half. There is a second quadrature data source 44 with a first output connected to a second quadrature synchronous digital modulator 48. The second quadrature synchronous digital modulator 48 has a first output connected to a second quadrature self synchronized scrambler 52. The second quadrature self synchronized scrambler 52 has a first output connected to a second quadrature DS-PN SS converter 56. The second quadrature DS-PN SS converter 56 has its output connected to a second quadrature gaussian converter 68.

Within the second quadrature gaussian converter 68 there is a second quadrature modulo 2 adder 64, and a second quadrature shift register 69 and a quadrature algebraic adder 70. The first quadrature gaussian converter 58 and the second quadrature gaussian converter 68 share a common element, the quadrature algebraic adder 70 and output bandpass filter. In this alternate embodiment of the invention, it is desirable to use two different Gold codes for the quadrature DS-PN SS. Using different Gold codes is best for low spread spectrum cross correlation. In all other respects, operation of the quadrature system for conversion of data into a noise-like waveform is the same as the embodiment shown in FIG. 1.

Those skilled in the art will appreciate that the embodiments of the present invention can be implemented in hardware, software or a combination of both. As an example, shift registers are available as hardware components and are commonly also implemented within a processor. Accordingly, the above description of the preferred embodiments is not limited to either a hardware or software implementation.

What is claimed is:
1. A system for converting digital data into a noise-like waveform comprising:
digital modulator means for digitally modulating the digital data,
self synchronized scrambler means for scrambling the digitally modulated digital data;
direct sequence pseudo noise spread spectrum converter means for converting the scrambled digitally modulated digital data into a direct sequence pseudo noise spread spectrum signal,
gaussian converter means for converting the direct sequence pseudo noise spread spectrum signal into a gaussian signal,
a bandpass filter operatively coupled to filter the gaussian signal; and
carrier signal generator, and wherein the digital modulator means comprises:
a first exclusive-or gate operatively coupled to perform an exclusive-or logic function on the digital data and the carrier signal to produce a digitally modulated signal.
2. The system for converting digital data into a noise like waveform of claim 1 wherein the self synchronized scrambler means comprises:
a first adder with a first and second input and an output,
a second adder with a first and second input and an output, a third adder with a first and second input and an output, a fourth adder with a first and second input and an output, a first shift register with a first input and a plurality of tapped outputs, the first input of the fourth adder operatively coupled to receive digitally modulated data, the output of the fourth adder operatively coupled to the first input of the first shift register, first and second tapped outputs of the first shift register respectively and operatively coupled to the first and second inputs of the first adder, the output of the first adder operatively coupled to the first input of the second adder, a third tapped output of the first shift register operatively coupled to the second input of the second adder, the output of the second adder operatively coupled to the first input of the third adder, a fourth tapped output of the first shift register operatively coupled to the second input of the third adder, the output of the third adder operatively coupled to the second input of the fourth adder.

3. The system for converting digital data into a noise-like waveform of claim 1 further comprising:

spread spectrum clock generator;

a high speed maximal length shift register responsive to the spread spectrum clock generator; and wherein the direct sequence pseudo noise spread spectrum converter means comprises:

a second exclusive-or gate having a first input operatively coupled to the self synchronized scrambler signal, and a second input operatively coupled to the high speed maximal length shift register, and an output providing to the direct sequence pseudo noise spread spectrum signal.

4. The system for converting digital data into a noise-like waveform of claim 1 wherein the gaussian converter means comprises:

a modulo 2 adder having a plurality of inputs and a first output, a second shift register having a plurality of tapped outputs, an algebraic adder having a plurality of input, a first input of the modulo 2 adder operatively coupled to receive a signal responsive to the direct sequence pseudo noise spread spectrum signal, a first tapped output of the second shift register operatively coupled to a second input of the modulo 2 adder and to a first input of the algebraic adder, a second tapped output of the second shift register operatively coupled to a third input of the modulo 2 adder and to a second input of the algebraic adder, a third tapped output of the second shift register operatively coupled to a fourth input of the modulo 2 adder and to a third input of the algebraic adder, a fourth tapped output of the second shift register operatively coupled to a fifth input of the modulo 2 adder and to a fourth input of the algebraic adder, a fifth tapped output of the second shift register operatively coupled to a sixth input of the modulo 2 adder and to the fifth input of the algebraic adder, and the algebraic adder providing a gaussian signal responsive to an algebraic sum of the signals received at the plurality of inputs of the algebraic adder.

5. A system for converting digital data into a noise-like waveform comprising:

an analog to digital converter operatively connectable to receive analog data and to provide a digital data signal responsive to the analog data, digital modulator means for digitally modulating the digital data, self-synchronized scrambler means for scrambling the digitally modulated digital data, direct sequence pseudo noise spread spectrum converter means for converting the scrambled digitally modulated digital data into a direct-sequence pseudo noise spread spectrum signal, gaussian converter means for converting the direct-sequence pseudo noise spread spectrum signal into a gaussian signal, and a bandpass filter operatively coupled filter the gaussian signal.

6. The system for converting digital data into a noise-like waveform of claim 5, further comprising:

carrier signal generator, and wherein the digital modulator means comprises:

a first exclusive-or gate operatively coupled to perform an exclusive-or logic function on the digital data and the carrier signal to produce a digitally modulated signal.

7. The system for converting digital data into a noise-like waveform of claim 5, wherein the self synchronized scrambler means comprises:

a fourth adder with a first and second input and a first output, a third adder with a first and second input and a first output, a second adder with a first and second input and a first output, a first adder with a first and second input and a first output, a first shift register with a first input and a first output and a plurality of tapped outputs, the first input of the fourth adder operatively coupled to the digital modulator means, the first input of the fourth output operatively coupled to the first input of the first shift register, a first tapped output of the first shift register operatively coupled to the first input of the first adder, a second tapped output of the first shift register operatively coupled to the second input of the first adder, the first output of the first adder operatively coupled to the first input of the second adder, a third tapped output of the first shift register operatively coupled to the second input of the second adder, the first output of the second adder operatively coupled to the first input of the third adder, a fourth tapped output of the first shift register operatively coupled to the second input of the third adder, the first output of the third adder operatively coupled to the second input of the fourth adder.

8. The system for converting digital data into a noise-like waveform of claim 5 further comprising:

spread spectrum clock generator;

a high speed maximal length shift register responsive to the spread spectrum clock generator; and wherein the direct sequence pseudo noise spread spectrum converter means comprises:

a second exclusive-or gate having a first input operatively coupled to the self-synchronized scrambler signal, and a second input operatively coupled to the high speed maximal length shift register, and an output providing to the direct sequence pseudo noise spread spectrum signal.

9. The system for converting digital data into a noise-like waveform of claim 5, wherein the gaussian converter means comprises:
a modulo 2 adder having a plurality of inputs and a first output,
a second shift register having a plurality of tapped outputs, an algebraic adder having a plurality of input,
a first input of the modulo 2 adder operatively coupled to receive a signal responsive to the direct sequence pseudo noise spread spectrum signal,
a first tapped output of the second shift register operatively coupled to a second input of the modulo 2 adder and to a first input of the algebraic adder,
a second tapped output of the second shift register operatively coupled to a third input of the modulo 2 adder and to a second input of the algebraic adder,
a third tapped output of the second shift register operatively coupled to a fourth input of the modulo 2 adder and to a third input of the algebraic adder,
a fourth tapped output of the second shift register operatively coupled to a fifth input of the modulo 2 adder and to a fourth input of the algebraic adder,
a fifth tapped output of the second shift register operatively coupled to a sixth input of the modulo 2 adder and to the fifth input of the algebraic adder, and
the algebraic adder providing a gaussian signal responsive to an algebraic sum of the signals received at the plurality of inputs of the algebraic adder.

10. A method for converting digital data into a noise-like waveform comprising:
digitally modulating the digital data,
scrambling the digitally modulated digital data,
converting the scrambled digitally modulated digital data input into a direct sequence pseudo noise spread spectrum signal,
converting the direct sequence pseudo noise spread spectrum signal into a gaussian signal, and
filtering the gaussian signal, wherein digitally modulating the data input further comprises:
receiving a carrier signal, and
performing an exclusive-or of the digital data and the carrier signal.

11. The method for converting digital data into a noise-like waveform according to claim 10, further comprises scrambling the digitally modulated digital data by:
the scrambled digitally modulated digital data comprises a series digital signals providing a combination signal representative of a combination of selected ones of the series of digital signals with the digitally modulated data; and
providing the combination signal as one of the series of digital signals.

12. The method for converting digital data into a noise-like waveform according to claim 10, further comprises providing the direct sequence pseudo noise spread spectrum signal by:
providing a spread spectrum signal; and
combining the spread spectrum signal with the scrambled digitally modulated digital data.

13. The method for converting digital data into a noise-like waveform according to claim 10, further comprises providing the gaussian signal by:
providing a time delayed sequence of signals;
providing a combination signal by combining selected ones of the time delayed sequence of signals with the direct sequence pseudo noise spread spectrum signal;
obtaining an algebraic sum of the combination signal and selected ones of the time delayed sequence of signals.

14. A system for converting digital data into a noise-like waveform comprising:
digital modulator adapted to digitally modulate the digital data,
self synchronized scrambler adapted to scramble the digitally modulated digital data,
direct sequence pseudo noise spread spectrum converter adapted to convert the scrambled digitally modulated digital data into a direct sequence pseudo noise spread spectrum signal,
gaussian converter adapted to convert the direct sequence pseudo noise spread spectrum signal into a gaussian signal,
a bandpass filter operatively coupled to filter the gaussian signal; and
carrier sign generator, wherein the digital modulator further comprises a first exclusive-or gate operatively coupled to perform an exclusive-or logic function on the digital data and the carrier signal to produce a digitally modulated signal.

15. The system of claim 14 wherein the self synchronized scrambler further comprises:
a first adder with a first and second input and an output,
a second adder with a first and second input and an output,
a third adder with a first and second input and an output,
a fourth adder with a first and second input and an output,
a first shift register with a first input and a plurality of tapped outputs,
the first input of the fourth adder operatively coupled to receive digitally modulated data,
the output of the fourth adder operatively coupled to the first input of the first shift register,
first and second tapped outputs of the first shift register respectively and operatively coupled to the first and second inputs of the first adder,
the output of the first adder operatively coupled to the first input of the second adder,
a third tapped output of the first shift register operatively coupled to the second input of the second adder,
the output of the second adder operatively coupled to the first input of the third adder,
a fourth tapped output of the first shift register operatively coupled to the second input of the third adder,
the output of the third adder operatively coupled to the second input of the fourth adder.

16. The system of claim 14 further comprising:
spread spectrum clock generator;
a high speed maximal length shift register responsive to the spread spectrum clock generator; and
wherein the direct sequence pseudo noise spread spectrum converter further comprises:
a second exclusive-or gate having a first input operatively coupled to the self synchronized scrambler signal, and a second input operatively coupled to the high speed maximal length shift register, and an output providing to the direct sequence pseudo noise spread spectrum signal.

17. The system of claim 14 wherein the gaussian converter further comprises:

a modulo 2 adder having a plurality of inputs and a first output, a second shift register having a plurality of tapped outputs, an algebraic adder having a plurality of inputs, a first input of the modulo 2 adder operatively coupled to receive a signal responsive to the direct sequence pseudo noise spread spectrum signal, a first tapped output of the second shift register operatively coupled to a second input of the modulo 2 adder and to a first input of the algebraic adder, a second tapped output of the second shift register operatively coupled to a third input of the modulo 2 adder and to a second input of the algebraic adder, a third tapped output of the second shift register operatively coupled to a fourth input of the modulo 2 adder and to a third input of the algebraic adder, a fourth tapped output of the second shift register operatively coupled to a fifth input of the modulo 2 adder and to a fourth input of the algebraic adder, a fifth tapped output of the second shift register operatively coupled to a sixth input of the modulo 2 adder and to the fifth input of the algebraic adder, and the algebraic adder providing a gaussian signal responsive to an algebraic sum of the signals received at the plurality of inputs of the algebraic adder.

* * * * *

UNITED STATES PATENT AND TRADEMARK OFFICE
CERTIFICATE OF CORRECTION

PATENT NO. : 6,741,636 B1
DATED : May 25, 2004
INVENTOR(S) : Adam Lender et al.

It is certified that error appears in the above-identified patent and that said Letters Patent is hereby corrected as shown below:

Column 5,
Line 31, "spectrum DS-PM SS)" should read -- spectrum (DS-PN SS) --.
Line 34, "EX-OR gate 383." should read -- EX-OR gate 38B. --.

Column 13,
Line 13, "input." should read -- inputs. --.

Signed and Sealed this

Twentieth Day of July, 2004

JON W. DUDAS
*Acting Director of the United States Patent and Trademark Office*